No. 760,666. Patented May 24, 1904.

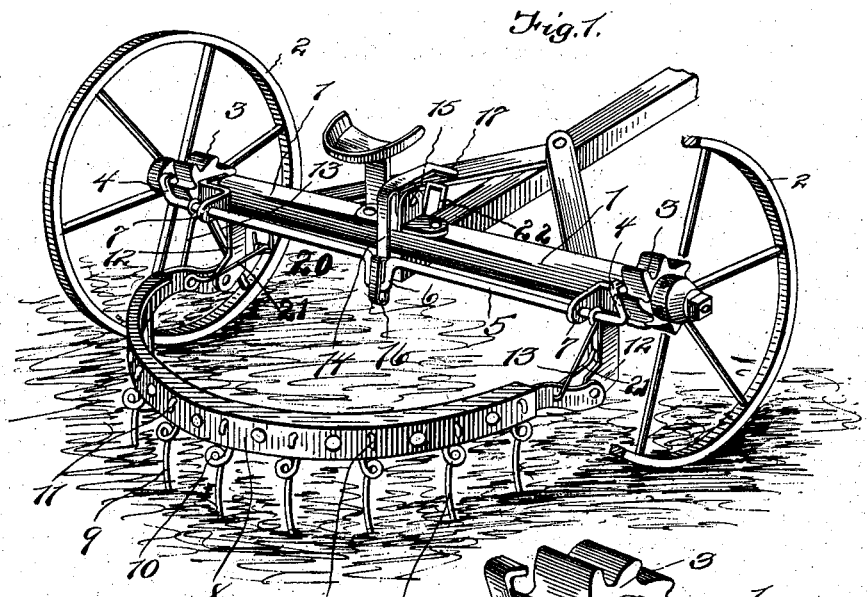
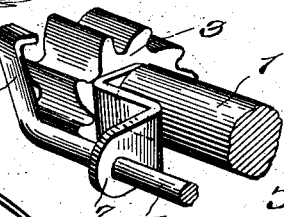
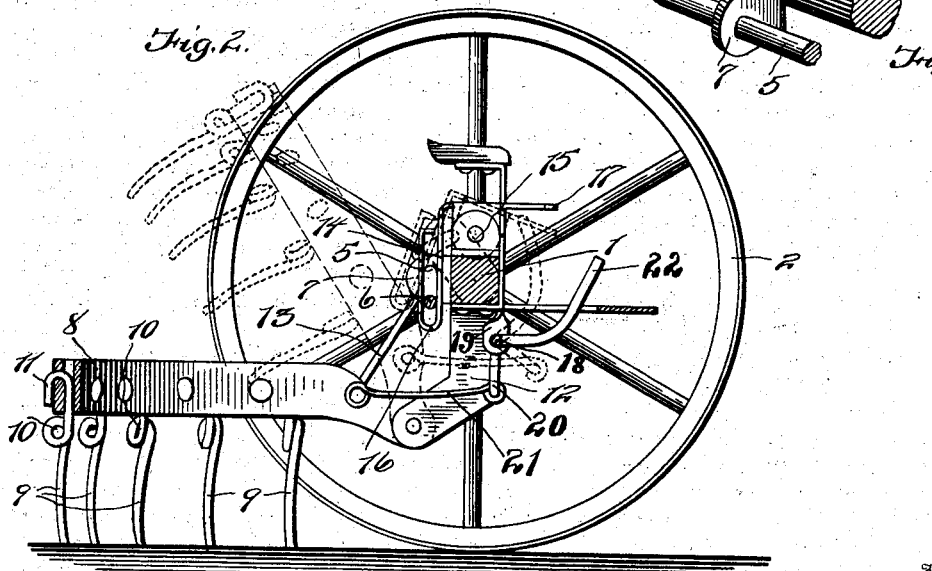

UNITED STATES PATENT OFFICE.

EDWARD WALRATH, OF LAFARGEVILLE, NEW YORK.

DUMPING-RAKE.

SPECIFICATION forming part of Letters Patent No. 760,666, dated May 24, 1904.

Application filed November 12, 1903. Serial No. 180,918. (No model.)

*To all whom it may concern:*

Be it known that I, EDWARD WALRATH, a citizen of the United States, residing at Lafargeville, in the county of Jefferson and State of New York, have invented certain new and useful Improvements in Dumping-Rakes; and I do hereby declare the following to be a full, clear, and exact description of the invention, such as will enable others skilled in the art to which it appertains to make and use the same.

My invention relates to dumping-rakes, and more particularly to a rake to be used to place the hay in bunches or haycocks after it has been previously raked in windrows, which is accomplished by the ordinary hay-rake now in use.

My improved hay rake or cocker has a semicircular beam or teeth-carrying bar, the open end of the semicircle thus formed by the beam to be of any desired width, preferably from five to six feet, which will insure that the hay will be prevented from spreading and will carry it into a semicircular bunch, which on being dumped will be left in a round pile or in the form of a haycock, this being impossible with the dumping of any ordinary hay-rake as now constructed with a straight beam.

The object of my invention, among others, may therefore be said to be to so construct my rake-beam in semicircular form whereby the bunch of the hay will be reliably effected.

Other objects and advantages will be hereinafter made clearly apparent, reference being had to the accompanying drawings, which are made a part of this application, and in which—

Figure 1 shows a perspective view of my improved rake complete. Fig. 2 is a central sectional view of my rake. Fig. 3 is a perspective detail view of the devices employed to dump the rake or discharge it of its contents.

For convenience of reference the various details and coöperating accessories of my invention will be designated by numerals, the same numeral applying to a similar part throughout the several views.

In carrying out my invention I provide the main or supporting axle 1 of the usual or any preferred construction, having the carrying-wheels 2, as is common. Upon the inner end of each hub of the wheels 2 I rigidly secure a ratchet-wheel 3, having a series of forwardly-inclined teeth, and designed to coöperate with said teeth are the dogs or detents 4, which are the upwardly-bent ends of the crank-shaft 5, having the crank-section 6 located, preferably, in the central part thereof, said crank-shaft being provided with suitable bearings in the ears 7, as clearly shown.

As will be observed by reference to the drawings, my rake-beam is curved throughout its entire length and may be made of any suitable material, preferably of angle-iron or steel, each end of which is properly connected in any suitable manner, as will be hereinafter more particularly pointed out, to the carrying-axle. I prefer to bend each end slightly downward, thereby placing the draft or load below the top of the rake-teeth, which will insure that the teeth will more reliably remain in their operative position or in close contact with the surface of the ground, which is a very valuable and important desideratum, inasmuch as a rake beam and teeth are required to carry a very heavy load, and thereby overcome a very severe strain placed thereon incident to use. The rake-beam is provided with a plurality of spring-teeth 9, which are preferably about two feet in length, more or less, and stand in a substantially vertical position, and are curved or directed forward sufficiently far to cause them to take into the hay. Each tooth is also bent upon itself to provide a complete coil 10, while the extreme upper end of each tooth is bent in the form of a hook, said hook being inserted through a suitable aperture provided in the brake-beam 8, the free end of the hook being indicated by the numeral 11.

My improved rake-beam is to be operatively connected with the supporting-axle in the manner substantially as set forth, whereby a reliable control upon the rake-beam is secured, which will permit the operator to readily discharge the load at any desired point. The forward ends of the rake-beam are pivotally connected, as will be noted by reference to the drawings, to the lower end of the depending bracket 12, the upper end of which is firmly connected to the axle. It will also be observed that I have provided a link 13, the upper end of which is pivotally connected to the crank-shaft 5, while the lower end thereof is similarly connected to the end of the rake-beam, whereby when the crank-shaft is partially rotated the rake-beam is elevated. As hereinbefore stated, the forward ends of the rake-bar are pivotally connected to the lower end of the depending bracket 12, the upper end of which is firmly connected to the axle 1. I also provide the link 13, the upper end of which is pivotally connected to the crank-shaft 5, while the lower end thereof is similarly connected near the end of the rake-body 8, and it therefore follows that when the detents 4 are thrown forward in a manner hereinafter set forth said detents will engage one of the teeth upon the wheels 3 and elevate the ears 7, it being understood that said ears are loosely mounted upon the axle 1.

I desire to call special attention to the shape or form of my teeth-carrying bar or rake-beam 8, which by reference to Fig. 1 will be seen to be formed of a suitable piece of material, preferably angle-iron, bent substantially in the form of a half-circle. By this arrangement the said beam is bowed rearwardly and is necessarily of much greater length than would be required if said bar was extended straight across the rear of the machine, as is now common, and parallel with the axle of the rake. By thus rearwardly extending the bowed center of my rake-bar or teeth-carrying beam it is obvious that a much greater quantity of hay or other commodity forming the load may be engaged and carried by the teeth, inasmuch as said teeth are necessarily multiplied in number to meet the greater capacity of the rake beam. The machine also may be more easily turned with its load when provided with a semicircular rake-beam than would be possible if a straight beam was used, for the reason that the teeth would be left free to move laterally around the load of hay or the like, whereas if a straight rake-beam was used a greater strain would be placed upon the teeth in moving a portion of the load while turning. These are but a few of a large number of advantages arising from the use of my semicircular rake-beam.

My rake-beam may be very cheaply manufactured of angle-iron, whereby it will possess the requisite strength to meet all requirements.

The crank 6 is pivotally connected to the lower end of the lever 14, said lever being properly fulcrumed near its upper end to the bracket or ear 15, it being understood that the lower end of the lever is properly formed, as by being bent back upon itself, so that a slotted opening 16 will be formed therein to receive the crank 6, this slotted opening being for the purpose of compensating for the forward movement of the crank when the detents or dogs 4 are in engagement with the wheels 2. The forward end of the lever is properly bent and shaped to provide the treadle-section 17, by means of which the foot of the operator is employed to depress the treadle and incidentally throw the crank 6 rearwardly, thereby causing the detents 4 to move forward into engagement with the contiguous tooth upon the wheels 3, the result being that as said wheels are turned forward by the rotation of the wheels 2 said wheels being rigidly connected together, as hereinbefore stated, the ears 7 will be raised and incidentally drawing upward the link-sections, the members 13, and the rake-body 8, to which they are connected, thereby elevating the rake-teeth out of engagement with their load.

In order to return the rake-body 8 to a horizontal position after it has been lifted to release the load, I provide a shaft 18, which is pivotally secured to the axle 1 by suitable brackets 19. The extreme outer ends of said shaft are bent downwardly to form crank-arms 20, to each of which is secured one end of a rod 21, the opposite ends of said rods being secured to the body 8. The central portion of said shaft is properly bent to form a lever or foot extension 22, said lever being located in convenient relation to the seat, so that when the rake-body 8 has been lifted, as shown by dotted lines in Fig. 2, the operator places his foot upon said lever and pushes downwardly thereon, this action serving to return said body to its horizontal plane. The aforesaid device also serves the purpose of holding the rake-body 8 downwardly and preventing the same from casual raising and incidentally losing or discharging the load.

It will thus be seen that I have provided a very simple though reliably-efficient mechanism for accomplishing the purposes hereinbefore set forth, and believing that the advantages, construction, and manner of using my invention have thus been made clearly apparent further description is deemed unnecessary.

Having thus fully described my invention, what I claim as new, and desire to secure by Letters Patent, is—

In a rake of the character specified, the combination with a suitable axle and carrying-wheels therefor, of a rake-beam operatively carried by said axle, said rake-beam being substantially semicircular in form; a plurality of teeth carried by said semicircular rake-beam and suitable means coöperating with the axle and said beam whereby the latter may be freely raised or lowered, all combined substantially as specified and for the purpose set forth.

In testimony whereof I affix my signature in presence of two witnesses.

EDWARD WALRATH.

Witnesses:
AMOS L. BRABANT,
JOSEPH X SHARROW.
his
mark.